United States Patent Office 3,577,479
Patented May 4, 1971

3,577,479
ALUMINUM HALIDE ISOMERIZATION OF SATURATED HYDROCARBONS
Donald E. Jost, Media, Edward J. Janoski, Havertown, and Abraham Schneider, Philadelphia, Pa., assignors to Sun Oil Company, Philadelphia, Pa.
No Drawing. Filed Aug. 9, 1968, Ser. No. 751,360
Int. Cl. C07c 5/28
U.S. Cl. 260—683.75                8 Claims

ABSTRACT OF THE DISCLOSURE

In the isomerization of $C_4$–$C_7$ paraffins with an aluminum halide catalyst in the presence of an inert halogenated hydrocarbon solvent, it has been found that the rate of isomerization and percentage yield is significantly increased when the solvent is present in amounts of from 10–50 volume percent based on the volume of the hydrocarbon feedstuff, and when, further, the aluminum halide catalyst is present in amounts in excess of what would be soluble in the solvent and paraffin feedstuff at the temperature employed.

BACKGROUND OF THE INVENTION

This invention relates to an improved process for the isomerization of paraffins. More particularly this invention relates to a method for increasing the isomerization rates and yields of $C_4$–$C_7$ saturated hydrocarbons by using a combination of aluminum halide catalyst and an inert halogenated hydrocarbon solvent in amounts substantially in excess of what have heretofore been employed.

U.S. Pat. 2,361,452 discloses an aluminum chloride isomerization process employing lower alkyl halides as solvents for the liquid phase system wherein the solvent is present in amounts of from 50 to 150 percent by weight of the hydrocarbon feed. Since it is well known that alkyl halides react with aluminum halides to produce hydrogen halides and polymeric materials, such a system does not suggest an economically desirable method for increasing the isomerization rates of $C_4$–$C_7$ paraffins. Moreover, the rates achieved by this method for converting butane to isobutane are only about 30 to 35 percent conversion over a two hour period.

U.S. Pat. 2,410,024 teaches a method for isomerizing normal aliphatic hydrocarbons with aluminum chloride, wherein aluminum chloride in amounts not exceeding that theoretically soluble in the tetrachloroethane solvent and hydrocarbon was employed. The conversion rate in this instance averaged about 50 percent conversion over a 24 hour period.

Neither of these patents, however, teaches or suggests that by substantially increasing the percentage of both the catalyst and the solvent, wherein the solvent is inert to the reaction, a significant increase in the isomerization conversion rate as well as yield per pass can be achieved.

SUMMARY OF THE INVENTION

It has now been found, in accordance with the present invention, that the rate of isomerization of paraffins such as n-butane, n-heptane, n-hexane and the like may be substantially increased when the reaction is carried out in the presence of substantial amounts of an inert halogenated hydrocarbon solvent and an amount of aluminum halide catalyst in excess of what would be soluble in the solvent-hydrocarbon mixture.

DESCRIPTION OF THE PREFERRED EMBODIMENTS

The charge stock used in the present process may be any $C_4$–$C_7$ paraffin, i.e., n-butane, n-pentane, n-hexane or n-heptane, or mixtures thereof, but $C_5$–$C_6$ hydrocarbons are preferred. When these starting materials are treated in accordance with the present process there are obtained the corresponding isobutane, isopentane, neo-hexane and the like.

The halogenated hydrocarbon solvent employed must be inert to the isomerization reaction conditions. Thus, such compounds as ethyl chloride, t-butylchloride and like alkyl halides are unsuitable inasmuch as they react with the aluminum halide catalyst to form hydrogen chloride, and polymeric materials which substantially deactivate the aluminum halide catalyst. Accordingly, suitable solvents may be selected from such compounds as methylene chloride, pentachlorethane, and the like, although 1, 1,2,2-tetrachloroethane is most preferred.

It is desirable, although not essential, that the halogenated hydrocarbon have a higher or lower boiling point than the hydrocarbon fraction being produced in order that it can be more readily separated from the final product by distillation and recycled to the reactor.

The solvent should be present in amounts of from 10 percent to 50 percent by volume based on the volume of the hydrocarbon feedstuff, and preferably from 15 percent to 30 percent. If the amount of solvent falls below these amounts, the isomerization rate is slowed considerably, while above these amounts excessive cracking of the hydrocarbon feedstuff takes place.

The catalyst for this process, as mentioned above, is an aluminum halide, and preferably aluminum chloride or aluminum bromide. The catalyst must be present in amounts in excess of what would be soluble in the solvent-hydrocarbon mixture at the temperatures employed, and preferably a large excess in amounts of from 5 to 50 times the theoretically soluble amount. Thus, for example, in the isomerization of normal hexane at a temperature of 95° C., these may be employed from 0.15 to 1.2 gms. of aluminum chloride per cc. of solvent and hydrocarbon.

In addition to the catalyst and solvent there should be included in the reaction medium, and preferably mixed in with the charge stock, a naphthene to serve as a cracking inhibitor. Thus, methylcyclopentane, methylcyclohexane or the like should be added to the extent of about 5 to 25 volume percent of the hydrocarbon charge stock. Alternatively, if a dearomatized naphtha is used as the charge stock, it will generally include within it sufficient naphthenes to act as cracking inhibitors without it being necessary to introduce additional naphthenes.

As a further cracking suppressor there may also be employed hydrogen. This hydrogen may be introduced into the reactor by pressuring the reactor with 25 to 100 p.s.i.g. hydrogen partial pressure.

A catalyst promotor should also desirably be added to the reaction to prevent rapid deactivation of the aluminum halide catalyst. As promotors, hydrogen halides, and preferably hydrogen chloride, may be employed, in quantities which are relatively small in proportion to the catalyst present. The addition of about 15 p.s.i.g. dry hydrogen chloride has been found to be satisfactory for this purpose.

Since the reaction is carried out under liquid phase conditions, any temperature below the critical temperature of the hydrocarbon-solvent mixture may be employed. Thus, a wide temperature range of from about 25° C. to 200° C. may be used, and preferably temperatures of from 75° C. to 100° C., particularly when a $C_5$–$C_6$ fraction is used as the charge stock.

The time of the reaction will vary depending upon the other reaction conditions. In general, however, the reaction time may be from 5 minutes to 2 hours, and preferably from 15 to 30 minutes, during which period when, for example, a $C_6$ fraction is employed, there is obtained a conversion of about 60 to 90 percent per pass.

Superatmospheric pressure may, if necessary, be employed to maintain the reactants in liquid phase conditions. However, the temperature and pressure conditions should always be adjusted so as to avoid as much as possible any cracking and/or disproportionation. Fortunately, one of the outstanding advantages of the present process is the lower temperature and shorter residence time of the reactants in the reactor, thereby substantially reducing such side reactions and increasing the yield per pass above what has thus far been achieved in the art.

The reaction may be carried out either as a batch process or as a continuous operation. In the latter case, the reactor may be a stirred vessel, or an ebullating or fixed bed may be employed, depending upon the amount of solid catalyst surface required. The solvent may be recovered from the final product and unreacted feed by distillation and recycled to the reactor. The unreacted feed may likewise be recovered by a second distillation and recycled.

Example I

A series of four runs were carried out wherein varying amounts of solid $AlCl_3$, n-hexane, and solvent (1,1,2,2-tetrachloroethane) where charged to bombs pressurized up to 15 p.s.i.g. with HCl and then to 100 p.s.i.g. with $H_2$, and allowed to react at the same temperature (95° C. to 98° C.) for the same period of time (15 minutes). A naphthene mixture comprising methylcyclopentane and methylcyclohexane was introduced into the reactor with the hydrocarbon fraction.

The results of these tests are shown in the following table:

TABLE I

| Run | 1 | 2 | 3 | 4 |
|---|---|---|---|---|
| Liquid charge, ml., (composition by volume) | 5 | 5 | 5 | 5 |
| n-hexane | 83.3 | 83.3 | 63.8 | 63.8 |
| Methylcyclohexane | 9.8 | 9.8 | 7.5 | 7.5 |
| Methylcyclopentane | 4.9 | 4.9 | 3.7 | 3.7 |
| 1,1,2,2-tetrachloroethane | 2.0 | 2.0 | 25.0 | 25.0 |
| $AlCl_3$ charge, grams | 0.15 | 5.0 | 0.15 | 5.0 |
| Hexane product distribution, percent: | | | | |
| n-hexane | 96.3 | 96.1 | 86.2 | 28.5 |
| 3-methylpentane | 0.9 | 7.3 | 3.9 | 16.7 |
| 2-methylpentane | 2.7 | 18.7 | 9.3 | 42.1 |
| 2,3-dimethylbutane | | | | |
| 2,2-dimethylbutane | 0.1 | 4.9 | 0.6 | 12.6 |
| n-hexane conversion, percent | 3.7 | 30.9 | 13.8 | 71.5 |

What is claimed is:

1. A process for the isomerization of paraffins having from 4 to 7 carbon atoms which comprises contacting said paraffins containing not more than about 25 volume percent of a naphthene, with an aluminum halide catalyst, a hydrogen halide promoter, hydrogen and a halogenated hydrocarbon solvent which is inert to the reaction conditions, wherein the solvent is present in amounts of from 10 to 50 volume percent based on the volume of the paraffin feedstuff, and wherein the aluminum halide catalyst is present in amounts of from 5 to 50 times by weight in excess of what would be soluble in the solvent and paraffin feedstuff at the temperature employed.

2. The process according to claim 1 wherein the halogenated hydrocarbon solvent is selected from the group consisting of 1,1,2,2-tetrachloroethane, pentachloroethane and methylene chloride.

3. The process according to claim 1 wherein the solvent is present in amounts of from 15 to 30 volume percent of the paraffin feedstuff.

4. The process according to claim 1 wherein the paraffin feedstuff is n-hexane.

5. The process according to claim 1 wherein the catalyst is aluminum chloride.

6. The process according to claim 1 wherein the reaction temperature is from about 25 to 200° C.

7. The process according to claim 1 wherein the reaction temperature is from about 75 to 100° C.

8. A process for the isomerization of $C_4$–$C_7$ paraffins which comprises contacting said paraffins containing not more than 25 volume percent of a naphthene, with aluminum chloride, hydrogen chloride, hydrogen and 1,1,2,2-tetrachloroethane, at a temperature of from 25 to 200° C., wherein the tetrachloroethane is present in amounts of from 10 to 50 volume percent based on the volume of the paraffin feedstuff and wherein the aluminum chloride is present in amounts of from 5 to 50 times by weight in excess of which would be soluble in the solvent and paraffin at the temperature employed.

References Cited

UNITED STATES PATENTS

| 2,334,553 | 11/1943 | Harding | 260—683.7 |
| 2,361,452 | 10/1944 | Brown | 260—683.76 |
| 2,410,024 | 10/1946 | Fawcett et al. | 260—683.76 |
| 2,411,835 | 11/1946 | Ross et al. | 260—683.75 |

DELBERT E. GANTZ, Primary Examiner

G. J. CRASANAKIS, Assistant Examiner